(12) United States Patent
Bakir et al.

(10) Patent No.: US 7,925,980 B2
(45) Date of Patent: Apr. 12, 2011

(54) N-WAY MULTIMEDIA COLLABORATION SYSTEMS

(75) Inventors: Tariq Bakir, Melbourne, FL (US); Aric W. Peterson, Palm Bay, FL (US); John Heminghous, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 628 days.

(21) Appl. No.: 12/033,141

(22) Filed: Feb. 19, 2008

(65) Prior Publication Data
US 2009/0210801 A1  Aug. 20, 2009

(51) Int. Cl.
  G06F 13/00 (2006.01)
  G06F 15/00 (2006.01)
(52) U.S. Cl. ........................ 715/740; 715/744
(58) Field of Classification Search .......... 715/763–765, 715/738–744, 551–855, 734
  See application file for complete search history.

(56) References Cited

U.S. PATENT DOCUMENTS

| | | | |
|---|---|---|---|
| 5,550,965 A | 8/1996 | Gabbe et al. | |
| 5,600,775 A | 2/1997 | King et al. | |
| 6,105,055 A | 8/2000 | Pizano et al. | |
| 6,237,025 B1 | 5/2001 | Ludwig et al. | |
| 6,321,252 B1 | 11/2001 | Bhola et al. | |
| 2006/0002315 A1* | 1/2006 | Theurer et al. | 370/261 |
| 2006/0285150 A1* | 12/2006 | Jung et al. | 358/1.15 |

FOREIGN PATENT DOCUMENTS

WO  WO-03019418  3/2003

* cited by examiner

*Primary Examiner* — Cao (Kevin) Nguyen
(74) *Attorney, Agent, or Firm* — Fox Rothschild, LLP; Robert J. Sacco (57) ABSTRACT

A method (400) for online collaboration among users at different locations sharing common motion imagery (302). The method involves storing data defining the motion imagery (MID) in a data store (104) associated with a motion image server (MIS) and communicating the motion imagery to a first client device (FCD). The method also involves generating at the FCD (106) an annotation (304, . . . , 308) capable of being displayed together with the motion imagery. The annotation is defined by metadata distinct from the MID and containing information to associate the metadata with the motion imagery. The method further involves communicating the metadata to the MIS (102), storing the metadata in the data store, and communicating the MID and the metadata to a second client device (SCD). The SCD (108) selectively displays the annotation together with the motion imagery in response to an input command of a second user.

18 Claims, 8 Drawing Sheets

N-WAY MULTIMEDIA COLLABORATION SYSTEMS

BACKGROUND OF THE INVENTION

1. Statement of the Technical Field

The invention concerns communications systems. More particularly, the invention relates to systems and methods for enabling users located in different geographic locations to share motion imagery intelligence, analyze, and collaborate in real-time using added metadata.

2. Description of the Related Art

It can be advantageous for analysts and tactical users located in different geographic locations to share motion imagery for various purposes. Sharing such imagery can allow such users to analyze and collaborate in real-time. The problem of video multimedia collaboration using live video streams and archived video has not been widely addressed. Conventional systems tend to focus on individual image frames and do not take full advantage of the temporal nature of video.

Web conferencing tools have attempted to address some of the foregoing issues. Such web conferencing tools can allow users to share applications and view videos of each other in real time. However, such systems are not well designed to exploit such real time video imagery for purposes of multi-user collaboration and analysis. For example, such systems do not adequately address the need for user annotation of the imagery and tracking the changes contributed by each user in real time. This is partly due to the focus of most such applications on passive video viewing. Only recently has motion imagery become widely available for analysis applications. Accordingly, there is a growing need for systems and methods that facilitate collaboration among a plurality of remote users when viewing real time video streams.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns a method for online collaboration among users at different locations sharing a common motion imagery. The common motion imagery can be archived motion imagery or live motion imagery. The method involves storing data defining motion imagery in a data store associated with a motion image server and communicating the motion imagery to a first client device. The method also involves generating at the first client device an annotation capable of being displayed together with the motion imagery. Notably, the annotation can be generated in response to an input command from a first user and defined by metadata. The annotation can be, but is not limited to, a free hand annotation, a text annotation, a symbolic annotation, or an audio annotation. The metadata can be, but is not limited to, distinct from the data defining the motion imagery and can contain information to associate the metadata with the motion imagery.

The method further involves communicating the metadata to the motion image server, storing the metadata in the data store stored separate from the data defining the motion imagery, and communicating the data defining the motion imagery and the metadata to a second client device. Upon receipt of the data, the second client device can selectively display the annotation together with the motion imagery in response to an input command of a second user.

According to an aspect of the invention, the method can involve dynamically modifying the annotation in accordance with a dynamic feature or content of the motion imagery. This dynamic modification can be achieved using temporal and/or spatial information in the motion imagery. The temporal and/or spatial information can be used to deform or adapt the annotation to the feature or content of the motion imagery.

According to another aspect of the invention, the method can involve concurrently displaying the motion imagery on the first and second client devices. The method can also involve displaying the annotation together with the motion imagery to the second user immediately after the annotation has been generated at the first client device. The method can further involve concurrently communicating motion imagery to two or more client devices and generating different annotations to the motion imagery in response to input commands from respective users of the client devices.

An online collaboration system is also provided. The system is comprised of a data store, a motion image server, a first client device, and a second client device. The motion image server is coupled to the data store. The motion image server can be configured to store data defining motion imagery in the data store and to store metadata separate the data defining the motion imagery. The motion image server is also configured to communicate the motion imagery to client devices. The motion image server can be further configured to dynamically modify the annotation in accordance with a dynamic feature or content of the motion imagery.

The first client device is coupled to the motion image server. The first client device is configured to generate an annotation capable of being displayed together with the motion imagery in response to a user action. The first client device is also configured for communicating metadata to the motion image server for storage in the data store. The second client device is also coupled to the motion image server. The first client device can be further configured to dynamically modify the annotation in accordance with a dynamic feature or content of the motion imagery.

The second client device is configured to receive the data defining the motion imagery and the metadata from the motion image server. The second client device is also configured to selectively display the annotation together with the motion imagery in response to an input command from a user. The second client device can be further configured to dynamically modify the annotation in accordance with a dynamic feature or content of the motion imagery.

According to another aspect of the invention, the system is configured so that the motion imagery is concurrently displayed on the first and second client devices. The system is also configured so that the annotation is displayed together with the motion imagery on the second client device immediately after the annotation has been generated at the first client device. The system is further configured so that a plurality of client devices can generate different annotations to the motion imagery in response to input commands from respective users of the client devices.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Embodiments of the invention provide methods (and related implementing systems) for enabling users to annotate motion imagery and tracking annotations made to the motion imagery by particular users. The motion imagery can be a live video and/or an archived video. The methods can also involve simultaneously displaying archived motion imagery and previously made annotations to a user of a computer system. The methods can further involve enabling a user located at a first geographic location to simultaneously view archived/live motion imagery and annotations being made to the motion imagery by another user located at a second geographic location (in real time). The methods can involve enabling multiple users located at a second geographic location to simultaneously view and annotate the same motion imagery.

The methods (and related implementing systems) can enable users located at different geographic locations to share motion imagery, analyze the motion imagery, and collaborate on certain projects. The collaboration can be achieved synchronously on live motion imagery or with archived motion imagery. The collaboration can also be achieved asynchronously on archived motion imagery. In an asynchronous scenario, users can analyze the archived motion imagery and related annotations at their own rate. One can appreciate that such methods (and related implementing systems) can be advantageously employed in surveillance applications, medical applications, flight applications, navigational application, border control applications, and other commercial applications.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing method embodiments of the present invention, it will be helpful in understanding an exemplary environment in which the methods can be utilized. In this regard, it should be understood that the methods of the present invention can be utilized in any application where users need to annotate shared motion imagery and view annotations previously made or being made in real time. Such applications include, but are not limited to, client-server based communications system applications, distributed network (or peer-to-peer) based communications system applications, and hybrid (or client-server and peer-to-peer) based communications system applications. Accordingly, methods of the present invention will now be described in relation to one particular application, namely, the hybrid based communications system application. It should be noted that client-server based communications systems and distributed network (or peer-to-peer) based communications systems are well known to those having ordinary skill in the art, and therefore will not be described herein.

Figure 1:
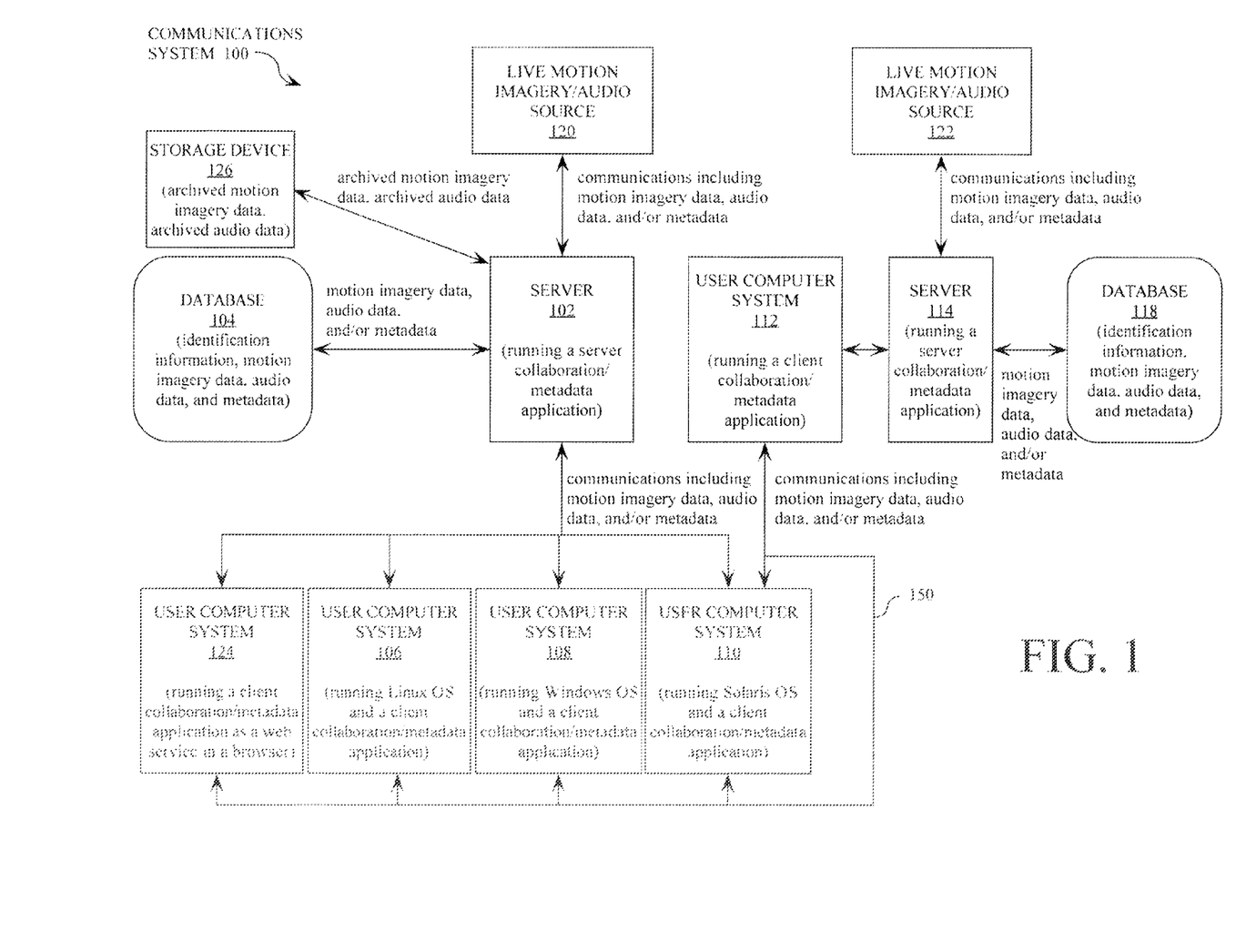
FIG. 1 is a block diagram of an exemplary communications system that is useful for understanding the present invention.

Referring now to FIG. 1, there is provided a block diagram of an exemplary communications system 100 that is useful for understanding the present invention. It should be noted that the communications system 100 is a hybrid (or client-server and peer-to-peer) based communications system. As such, the communications system 100 is comprised of servers 102, 114, user computer systems 106, . . . , 112, 124, databases 104, 118, a storage device 126, and live motion imagery/audio sources 120, 122. Each of the listed devices 102, . . . , 124 is well known to those having ordinary skill in the art, and therefore will not be described in detail herein. However, a brief discussion of the communications system 100 is provided to assist a reader in understanding the present invention.

Referring again to FIG. 1, the live motion imagery/audio sources (LMIASs) 120, 122 can generally be video cameras, audio recorders, manned ground surveillance vehicles, unmanned ground surveillance vehicles, manned Aerial surveillance vehicles, unmanned Aerial vehicles (UAVs), and/or the like. As such, each of the LMIASs 120, 122 can capture live video and/or live audio. Each of the LMIASs 120, 122 can also communicate live motion imagery data, live audio data, and/or internally generated metadata to the respective server 102, 114. It should be noted that the motion imagery data, audio data, and/or metadata can be communicated to a server 102, 114 using any known data transfer media (e.g., packets and messages). The live motion imagery can be infrared imagery, multi-spectral imagery (MSI), hyper-spectral imagery (HSI), ultra-spectral imagery (USI), polarimetric imagery (PI), and/or any other known type of motion imagery. The metadata can include data describing a context of motion imagery, content of motion imagery, a timing of motion imagery, and coordinates corresponding to specific frames of motion imagery.

The servers 102, 114 can generally be a desktop personal computer system, a laptop personal computer system, a personal digital assistant, a mobile computing device, or any other general purpose computer processing device. The server 102 can be comprised of hardware and/or software configured for accessing the storage device 126, reading data from the storage device 126, and writing data to the storage device 126. The software can generally include a customized server collaboration/metadata application (as shown in FIG. 1). The data can include archived motion imagery data and archived audio data. The storage device 126 can be any type of storage device known to those having ordinary skill in the art (e.g., a hard drive and a database). The archived motion imagery can be infrared imagery, multi-spectral imagery (MSI), hyper-spectral imagery (HSI), ultra-spectral imagery (USI), polarimetric imagery (PI), and/or any other known type of motion imagery.

Each of the servers 102, 114 can be comprised of hardware and/or software configured for accessing a respective database 104, 118, reading data from the respective database 104, 118, and writing data to the respective database 104, 118. The software can generally include a customized server collaboration/metadata application (as shown in FIG. 1). The data can include identification information, motion imagery data, audio data, and metadata. The metadata can include data describing a context of motion imagery, content of motion imagery, a timing of motion imagery, coordinates corresponding to specific frames of motion imagery, and annotations made by a user (not shown) of a computer system 106, . . . , 112, 124 to motion imagery displayed thereon.

Each of the servers 102, 114 can also receive communications of live motion imagery and/or audio data from the respective LMIASs 120, 122, process the received data, and communicate the data to the respective database 104, 118 and/or user computer system(s) 106, . . . , 112, 124. The video/audio data can be communicated to the devices 104, 118, 106, . . . , 112, 124 using any known data transfer media (e.g., packets and messages).

Each of the servers 102, 114 can further process received motion imagery data, generate an annotation for the motion imagery using the motion imagery data, and generate metadata subsequent to generating an annotation. In such a scenario, the server 102, 114 can communicate the metadata to the respective database 104, 118 and/or user computer system(s) 106, . . . , 112, 124. The annotation can be a text annotation, a symbolic annotation, or a pre-recorded audio annotation. The metadata can include information identifying the motion imagery, information defining the annotation, information identifying a time of the motion imagery when the annotation is to be displayed, and/or a frame (or segment) of the motion imagery that was annotated.

According to an embodiment of the invention, metadata is stored at memory locations in a respective database 104, 118 that are distinct from the memory locations of video/audio data. Also, the metadata is stored in a storage device 104, 118 different from the storage device 126 where archived motion imagery and audio data is stored. As such, the original integrity of the motion imagery data and audio data is maintained. Still, the invention is not limited in this regard.

According to another embodiment of the invention, the server 102 can communicate data to the user computer systems 106, 108, 110, 124 via a unicast, multicast, and/or broadcast transmission. Similarly, the server 114 can communicate data to the user computer system 112 via a unicast, multicast, and/or broadcast transmission. The user computer system 112 can communicate data to the user computer systems 106, 108, 110, 124 via a unicast, multicast, and/or broadcast transmission. Unicast, multicast, and broadcast transmissions are well known to those having ordinary skill in the art, and therefore will not be described herein. Still, the invention is not limited in this regard.

Referring again to FIG. 1, each of the servers 102, 114 can also include system interfaces (not shown). The system interfaces (not shown) can allow the server 102, 114 to communicate directly or indirectly with the respective storage devices 104, 118, 126 and respective user computer systems 106, . . . , 112, 124. For example, if the server 102 is communicating indirectly with the user computer system 106, then the server 102 sends and receives communications through a network (not shown). For example, the network (not shown) can be a wireless network such as a local area network, a wide area network, or a personal area network. Still, the invention is not limited in this regard.

Each of the servers 102, 114 can include hardware and/or software configured to receive metadata from a respective user computer system 106, . . . , 112, 124 and process the same. In this regard, it should be understood that the servers 102, 114 can forward the metadata to a storage device 104, 118, 126 for storage. The servers 102, 114 can also process the metadata for deforming or adapting annotations to a particular feature of motion imagery or in accordance with content of motion imagery. These deformation and adaptation functions (or operations) of the servers 102, 114 will become more evident as the discussion progresses.

As shown in FIG. 1, the user computer system 112 can be coupled to one or more of the user computer systems 106, 108, 110, 124. In this regard, it should be understood that the user computer system 112 can act as a gateway node between the server 114 and the user computer systems 106, 108, 110, 124. Gateway nodes are well known to those having ordinary skill in the art, and therefore will not be described herein. However, it should be understood that the user computer systems 106, 108, 110, 124 are coupled to the server 114 via a communications path 150 inclusive of the user computer system 112. As such, the user computer systems 106, 108, 110, 124 can read data from and write data to the database 118 via the communications path 150. The user computer system 112 can also receive live video data (captured by LMIA 122) from the server 114 and forward the same to the user computer systems 106, 108, 110, 124 via the communications path 150. Similarly, each of the user computer systems 106, 108, 110, 124 can act as a gateway node between the server 102 and the user computer system 112.

Figure 2:
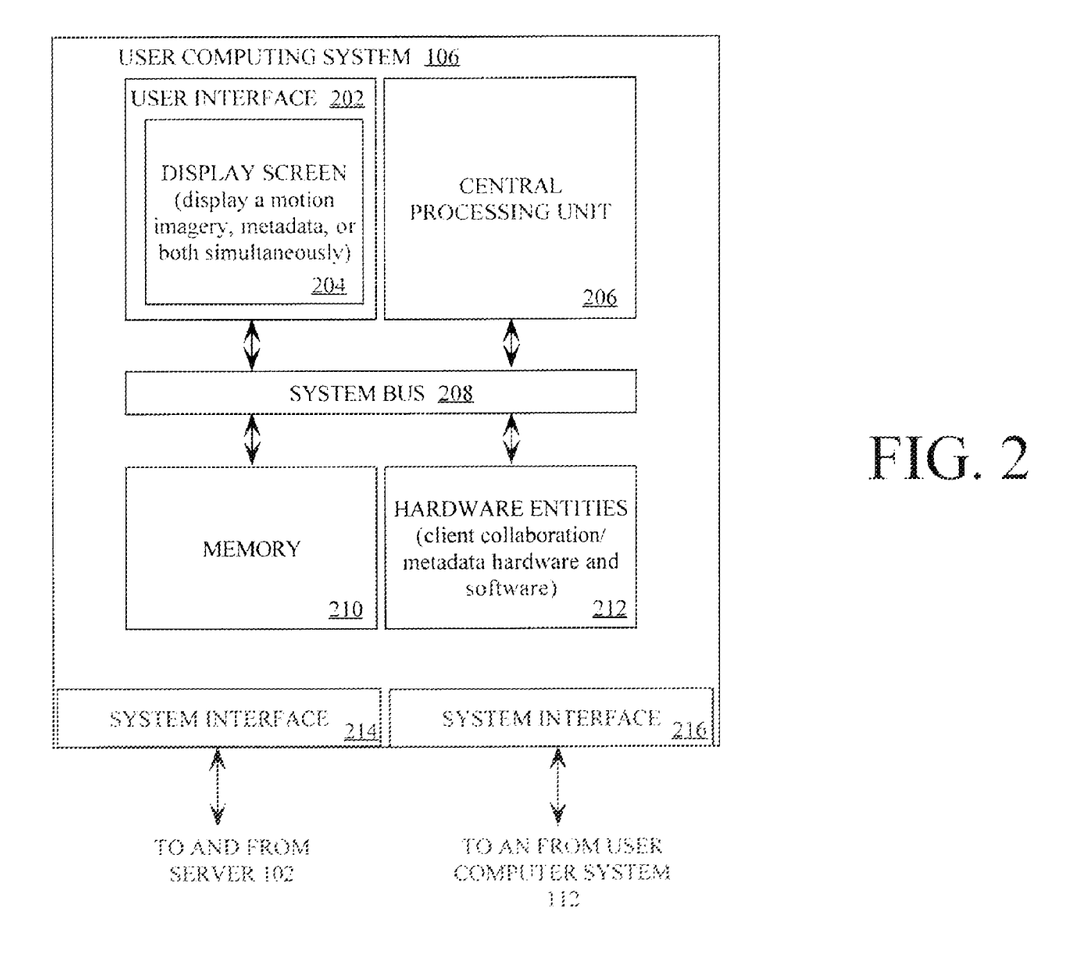
FIG. 2 is a block diagram of a user computer system of FIG. 1.

Referring now to FIG. 2, there is provided a block diagram of the user computer system 106 that is useful for understanding the present invention. It should be noted that the user computer systems 108, 110, 112, 124 are the same as or substantially similar to the user computer system 106. As such, the discussion provided below in relation to FIG. 2 is sufficient for understanding the user computer systems 108, 110, 112, 124. However, it should be noted that the user computer systems 106, . . . , 112, 124 can exist at different geographic locations. The user computer systems 106, . . . , 112, 124 can also employ the same or different operating system (as shown in FIG. 1). For example, the user computer system 106 can employ a Linux operating system (OS). The user computer system 108 can employ a Windows OS. The user computer system 110 can employ a Solaris OS. Still, the invention is not limited in this regard. Each of the above listed OSs is well known to those having ordinary skill in the art, and therefore will not be described herein.

It should also be noted that the each of the user computer systems 106, 108, 110, 112, 124 can be configured to run a customized client collaboration/metadata application. The customized client collaboration/metadata application can generally be provided for enabling an annotation of motion imagery, the generation of metadata, and the simultaneous displaying of motion imagery and metadata (e.g., annotations) to users of respective computer systems 106, 108, 110, 112, 124. The customized client collaboration/metadata application can be OS independent. The customized client collaboration/metadata application can also be a web service, appellate, or application accessible via a Web browser (as shown in FIG. 1 in relation to user computer system 124). Still, the invention is not limited in this regard.

As shown in FIG. 2, the user computer system 106 is comprised of system interfaces 214, 216, a user interface 202, a central processing unit 206, a system bus 208, a memory 210 connected to and accessible by other portions of the user computer system 106 through the system bus 208, and hardware entities 212 connected to the system bus 208. At least some of the hardware entities 212 perform actions involving access to and use of the memory 210, which for example may be a random access memory (RAM), a disk driver, and/or a compact disc read only memory (CD-ROM).

Figure 3A:
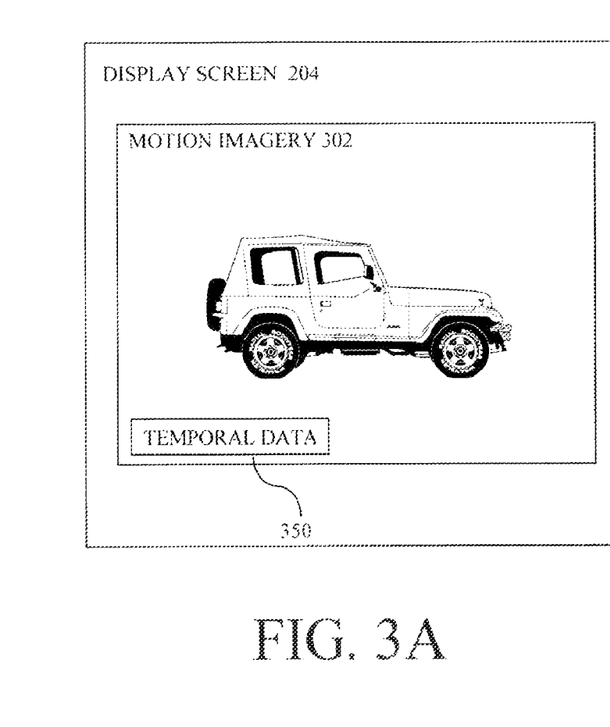
FIG. 3A is a schematic illustration of motion imagery displayed on a display screen of the user computer system of FIGS. 1-2.

The hardware entities 212 may include microprocessors, application specific integrated circuits (ASICs), and/or other hardware. The hardware entities 212 may include a microprocessor programmed for displaying motion imagery and metadata on a display screen 204. A schematic illustration of the display screen 204 having motion imagery 302 and temporal data 350 displayed thereon is provided in FIG. 3A. As should be understood, the temporal data 350 can generally include metadata describing or defining timing values and coordinate values corresponding to specific frames of motion imagery.

Figure 3B:
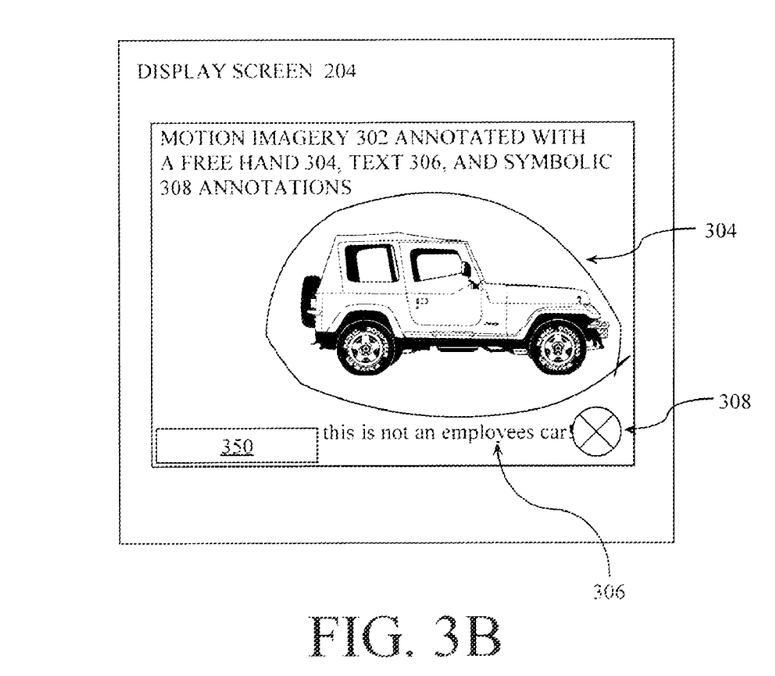
FIG. 3B is a schematic illustration of the motion imagery of FIG. 3A having annotations displayed therewith.

Referring again to FIG. 2, the hardware entities 212 may also include a microprocessor programmed for enabling an annotation of motion imagery by a user (not shown). A schematic illustration of the motion imagery 302 annotated with a plurality of annotations is provided in FIG. 3B. As shown in FIG. 3B, the display screen 204 has motion imagery 302, temporal data 350, and annotations 304, 306, 308 simultaneously displayed thereon. The annotations can include, but are not limited to, a free hand annotation 304, a text annotation 306, a symbolic annotation 308, and an audio annotation (not shown). Still, the invention is not limited in this regard. Any type of annotation can be made by a user (not shown) in accordance with a particular communications system 100 application.

Figure 3C:
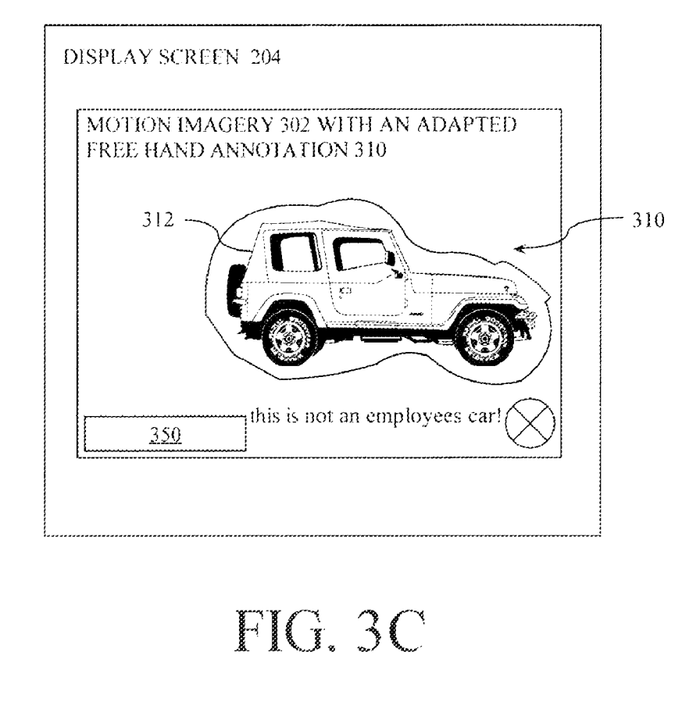
FIG. 3C is a schematic illustration of the motion imagery of FIG. 3A having an adapted free hand annotation displayed therewith.

Referring again to FIG. 2, the hardware entities 212 may include a microprocessor programmed for deforming or adapting an annotation to a feature of motion imagery or in accordance with content of motion imagery. As schematic illustration of an adapted free hand annotation 310 is provided in FIG. 3C. As shown in FIG. 3C, the display screen 204 has motion imagery 302, temporal data 350, and an adapted free hand annotation 310 simultaneously displayed thereon. The shape of a free hand annotation (e.g., the annotation 304 shown in FIG. 3B) has been changed so as to conform to the shape of an object of interest (e.g., a car 312). The invention is not limited in this regard.

Figure 3D:
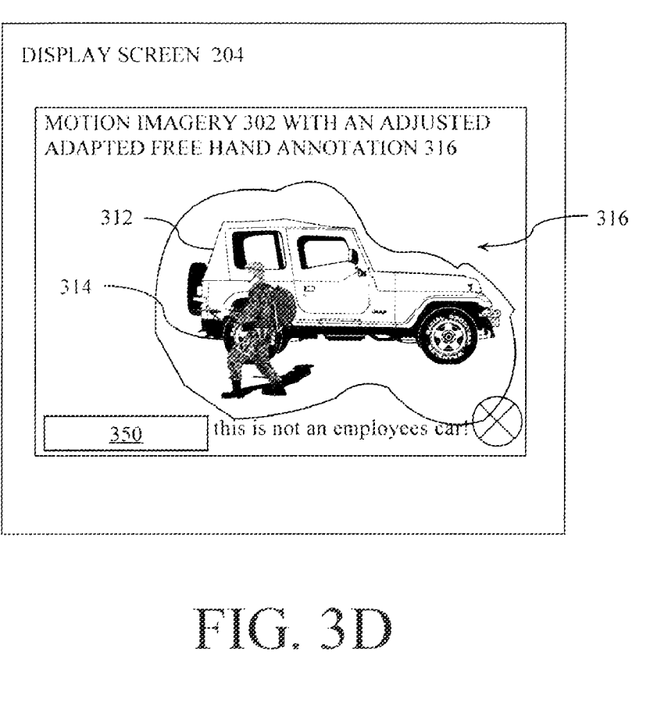
FIG. 3D is a schematic illustration of the motion imagery of FIG. 3A having an adapted free hand annotation displayed therewith.

Referring again to FIG. 2, the microprocessor can also be programmed for adjusting a deformed or adapted annotation to motion imagery feature changes or in accordance with motion imagery content changes. A schematic illustration of an adjusted adapted annotation 316 is provided in FIG. 3D. As shown in FIG. 3D, the display screen 204 has motion imagery 302, temporal data 350, and an adjusted adapted free hand annotation 316 simultaneously displayed thereon. The shape of a previously adapted annotation (e.g., the annotation 310 shown in FIG. 3C) has further been changed so as to encompass the man 314 standing next to the object of interest (i.e., the car 312). The invention is not limited in this regard.

Referring again to FIG. 2, the hardware entities 212 may further include a microprocessor programmed for generating metadata in response to an annotation made to motion imagery by a user (not shown). The metadata can generally include information defining an annotation, information identifying the motion imagery, information identifying a frame (or segment) of the motion imagery in which the annotation was placed, information identifying the time of the motion imagery when the annotation was made, and/or information identifying the user computer system 106. The metadata can also include information relating voice messages to motion imagery timing information. Still, the invention is not limited in this regard.

The microprocessor can further be programmed for communicating the metadata to the server 102 or user computer system 112. According to an embodiment of the invention, the user computer system 106 can communicate metadata to the server 102 using a transmission control protocol and internet protocol (TCP/IP) connection. TCP/IP connections are well known to those having ordinary skill in the art, and therefore will not be described herein. Still, the invention is not limited in this regard.

The hardware entities 212 may include a microprocessor programmed for simultaneously displaying motion imagery and annotations to the motion imagery made by a user (not shown) of a different user computer system 108, 110, 112, 124. The microprocessor can also be programmed for preventing certain annotations from being simultaneously displayed with motion imagery on the display screen 204. This annotation display prevention can be provided by filtering out annotations made by a user (not shown) of a pre-selected user computer system (e.g., user computer system 108). The user computer system selection can be made by a user (not shown) of the user computer system 106 using a drop down menu displayed on the display screen 204. Still, the invention is not limited in this regard.

Referring again to FIG. 2, the user interface 202 is generally comprised of input devices, output devices, and software routines configured to allow a user to interact with and control software applications installed on the user computer system 106. Such input and output devices include, but are not limited to, a display screen 204, a speaker (not shown), a keypad (not shown), a directional pad (not shown), a directional knob (not shown), and a microphone (not shown). As such, the user interface 202 can facilitate a user-software interaction for communicating with the server 102 and user computer system 112. The user interface 202 can also facilitate a user-software interaction for annotating motion imagery. The user interface 202 can also facilitate a user-software interaction for selecting a user computer system (e.g., user computer system 108 or user computer system 110) in which annotations made to motion imagery displayed thereon are to be filtered out or prevented from being displayed on display screen 204.

The system interface 214 can allow the user computer system 106 to communicate directly or indirectly with the server 102. Similarly, the system interface 216 can allow the user computer system 106 to communicate directly or indirectly with the user computer system 112. For example, if the user computer system 106 is communicating indirectly with the user computer system 112, than the user computer system 106 sends and receives communications through a network (not shown). For example, the network (not shown) can be a wireless network such as a local area network, a wide area network, or a personal area network. The invention is not limited in this regard.

Figure 4A:
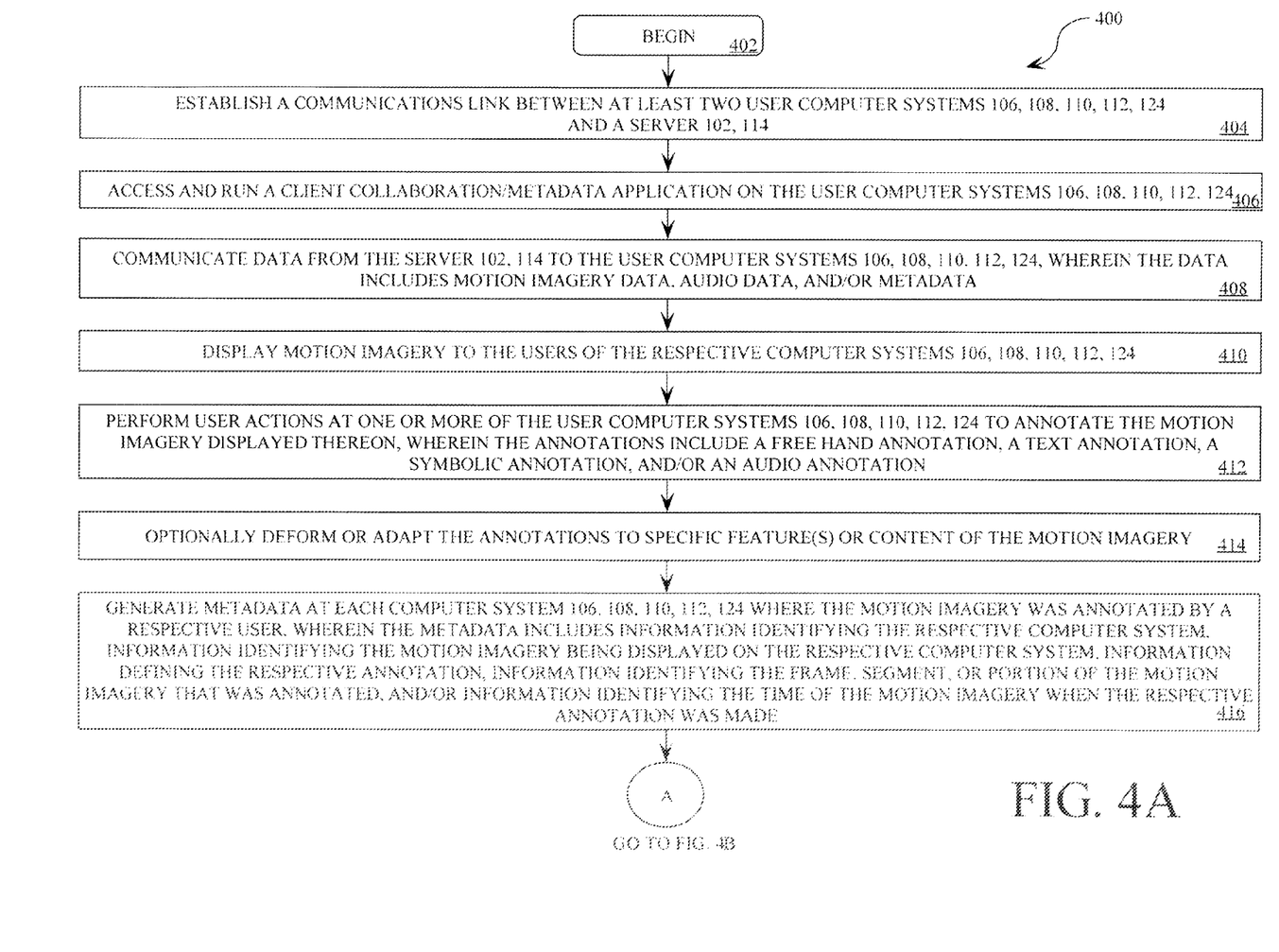
FIGS. 4A-4B collectively provide a flow diagram of a method for annotating motion imagery displayed on a computer system and simultaneously displaying motion imagery and annotations on the same or different computer system.
Figure 4B:
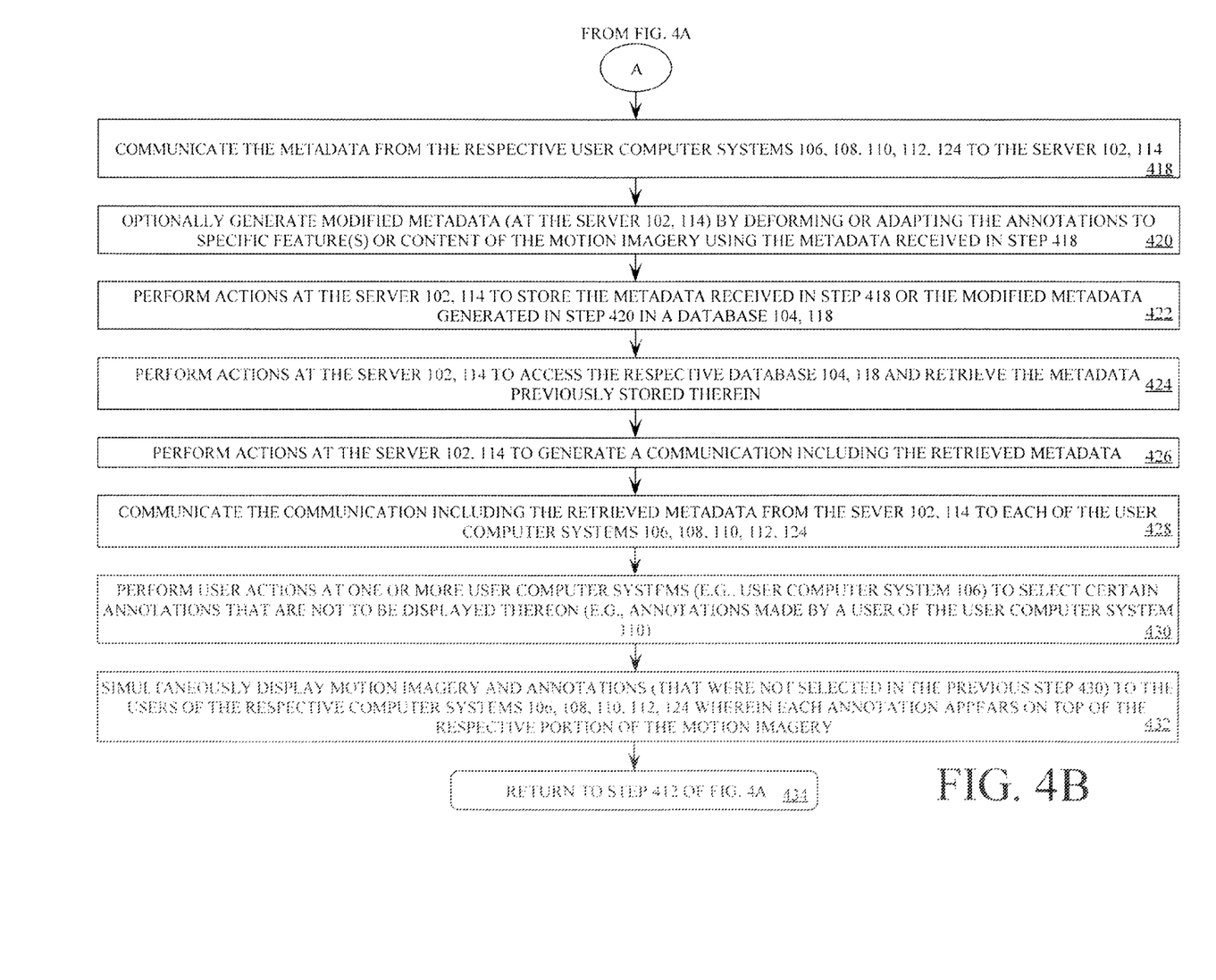

FIGS. 4A-4B and accompanying text described below illustrate an exemplary method 400 according to an embodiment of the invention. The method 400 is provided for annotating motion imagery displayed on a computer system and simultaneously displaying motion imagery and annotations on the same or different computer system. It should be appreciated, however, that the method 400 disclosed herein is provided for purposes of illustration only and that the present invention is not limited solely to the particular method shown.

Referring now to FIGS. 4A-4B, there is provided a flow diagram of a method 400 for annotating motion imagery displayed on a computer system and simultaneously displaying motion imagery and annotations on the same or different computer system. As shown in FIG. 4A, the method 400 begins at step 402 and continues with step 404. In step 404, a communications link is established between at least two user computer systems (e.g., user computer systems 106, . . . , 112, 124 of FIG. 1) and a server (e.g., server 102, 114 of FIG. 1). Thereafter, step 406 is performed where a client collaboration/metadata application is accessed and run on the user computer systems (e.g., user computer systems 106, . . . , 112, 124).

Figure 6:
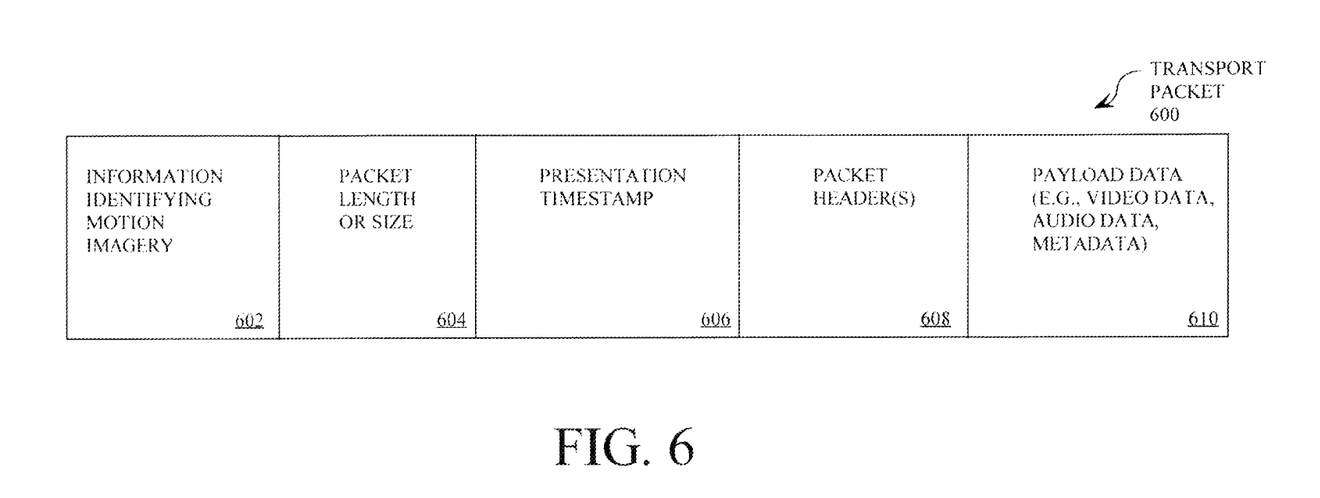
FIG. 6 is a schematic illustration of an exemplary transport packet structure that is useful for understanding the present invention.

Subsequent to completing step 406, method 400 continues with step 408. In step 408, data is communicated from the server (e.g., server 102, 114) to the user computer systems (e.g., user computer systems 106, . . . , 112, 124). As noted above, the data can include, but is not limited to, live motion imagery data, live audio data, archived motion imagery data, archived audio data, and/or metadata. As also noted above, the data can be communicated from the server to the user computer system(s) using any known transfer media, such as a transport packet. An exemplary structure for a transport packet is provided in FIG. 6. As shown in FIG. 6, the transport packet 600 is comprised of information identifying the motion imagery 602, information defining the packet length and/or size 604, information defining a presentation timestamp 606, packet header(s) 608, and payload data 610. Packet headers 608 are well known to those having ordinary skill in the art, and therefore will not be described herein. The payload data 610 can include video data, audio data, and/or metadata. The invention is not limited in this regard.

Referring again to FIG. 4A, the method continues with step 410. In step 410, the user computer systems (e.g., user computer systems 106, . . . , 112, 124) display live or archived motion imagery to the respective users (in step 410). In step 412, user actions are performed at one or more of the user computer systems (e.g., user computer systems 106, . . . , 112, 124) to annotate the motion imagery being displayed thereto. As noted above, the annotations can include, but are not limited to, a free hand annotation, a text annotation, a symbolic annotation, and/or an audio annotation.

Step 412 can also involve performing at least one algorithm at the user computer systems (e.g., user computer system 106, . . . , 112, 124) to create the annotation in response to the user action. The at least one algorithm include, but is not limited to, a Fast Marching Algorithm, a Canny Algorithm, and/or a SUSAN principle based algorithm. Each of these algorithms is well known to those having ordinary skill in the art, and therefore will not be described herein. However, it should be understood that each of these algorithms can use temporal and spatial information in the frames of motion imagery to electronically create an annotation and generate metadata defining an annotation. The temporal information can generally include data referring to time. The spatial information can generally include data referring to a location, shape, and relationship among features of motion imagery.

After the motion imagery has been annotated, the method 400 continues with optional step 414. In optional step 414, the user computer systems (e.g., user computer system 106, . . . , 112, 124) can automatically deform or adapt the respective annotations to a specific feature of the motion imagery or in accordance with the content of the motion imagery.

In this regard, it should be understood that step 414 can generally involve using intelligent algorithms to highlight objects of interest in motion imagery. Step 414 can also involve using edge detection algorithms to dynamically deform or re-deform an annotation around an object of interest so that it essentially outlines peripheral edges of the object of interest. Accordingly, annotations are adaptive in nature, i.e., the shape of an annotation can be continuously reformed so as to essentially outline peripheral edges of the object of interest at all times. The adaptive feature of annotations allows significant changes in the object of interest to be highlighted and tracked. The intelligent and edge detection algorithms include, but are not limited to, a Fast Marching Algorithm, a Canny Algorithm, and/or a SUSAN principle based algorithm. The intelligent and edge detection algorithms can use temporal information of the frames of motion imagery to deform annotations.

Step 414 can further involve using intelligent image and signal processing algorithms to adapt and convey additional metadata related to the object(s) of interest being annotated. The intelligent image and signal processing algorithms use temporal and spatial information of the frames of motion imagery to modify annotations. The modified annotations can reflect updated changes in the frames that would be relevant to a user (not shown). For example, a color of an annotation can be changed, automatically or in response to a user action, depending on the day/night nature of motion imagery or to track objects depending on their acceleration and velocity. Still, the invention is not limited in this regard.

Figure 7:
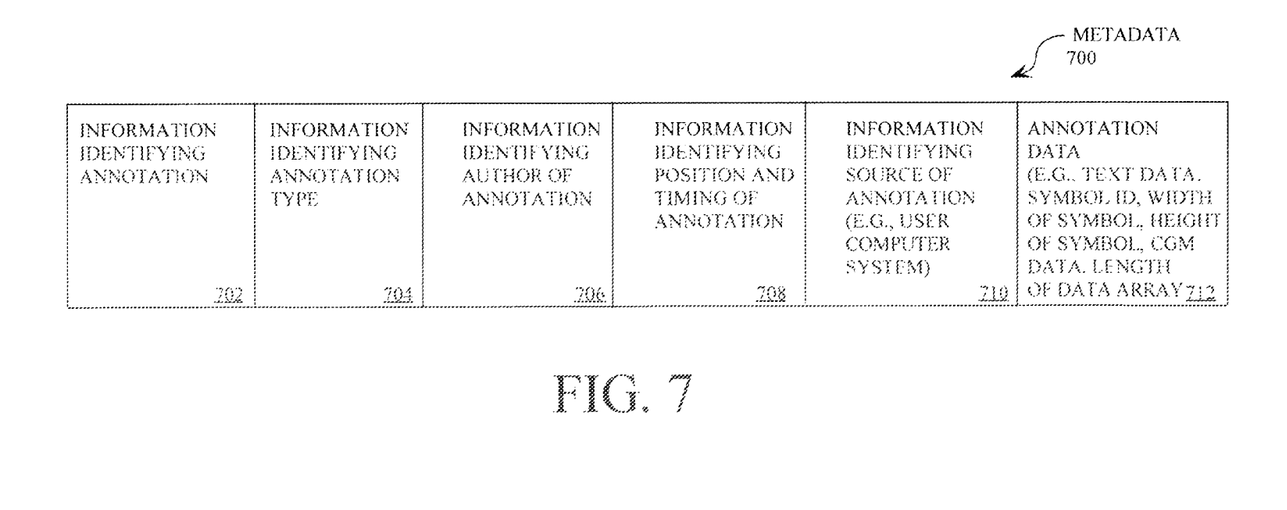
FIG. 7 is a schematic illustration of an exemplary metadata structure that is useful for understanding the present invention.

Subsequent to the completion of step 412 or optional step 414, the method 400 continues with step 416. In step 416, metadata is generated at the user computer systems (e.g., user computer system 106, . . . , 112, and/or 124) where the motion imagery was annotated by respective users. A schematic illustration of metadata is provided in FIG. 7. As shown in FIG. 7, the metadata 700 can include information identifying the annotation 702, information identifying the annotation type 704, information identifying the author of the annotation 706, information identifying the position of the annotation within the motion imagery (and/or timing information of the motion imagery) 708, information identifying the source of the annotation 710, and annotation data 712. The annotation types 704 can include, a text annotation, a symbolic annotation, a free hand annotation, and an audio annotation. The author information 706 can include information identifying a user who performed user actions to generate the annotation. The annotation source information 710 can include information identifying the user computer system. The annotation data 712 can include different data for each type of annotation. For example, if the annotation is a text annotation, then the annotation data 712 includes text data. If the annotation is a symbolic annotation, then the annotation data 712 includes data identifying the symbol, data defining the width of the symbol, and data defining the height of the symbol. If the annotation is a free hand annotation, then the annotation data includes CGM data and data defining a length of a data array. As should be understood, CGM is a format defined by the International Organization for Standards (ISO) for digitally describing vector, raster, and hybrid (raster and vector) graphic pictures very compactly. The invention is not limited in this regard.

Referring again to FIG. 4A, the method 400 continues with step 418 of FIG. 4B. In step 418 of FIG. 4B, the metadata is communicated from the respective user computer systems (e.g., user computer system 106, . . . , 112, 124) to the server (e.g., server 102, 114). Thereafter, an optional step 420 can be performed. In optional step 420, the server (e.g., server 102, 114) generates modified metadata using the metadata received in the previous step 418. The modified metadata can be generated in response to automatically deforming or adapting the respective annotation(s) to a specific feature of the motion imagery or in accordance with the content of the motion imagery.

In this regard, it should be understood that step 420 can generally involve using intelligent algorithms to highlight objects of interest in motion imagery. Step 420 can also involve using edge detection algorithms to dynamically deform or re-deform an annotation around an object of interest so that it essentially outlines peripheral edges of the object of interest. The intelligent and edge detection algorithms include, but are not limited to, a Fast Marching Algorithm, a Canny Algorithm, and/or a SUSAN principle based algorithm. The intelligent and edge detection algorithms can use temporal information of the frames of motion imagery to deform annotations. Step 420 can further involve using intelligent image and signal processing algorithms to adapt and convey additional metadata related to the object(s) of interest being annotated. The intelligent image and signal processing algorithms can use temporal and spatial information of the frames of motion imagery to modify annotations.

After completing step 418 or optional step 420, the method 400 continues with step 422. In step 422, the server (e.g., server 102, 114) stores the metadata received in the previous step 418 or the modified metadata generated in the previous optional step 420 in a database (e.g., database 104, 118 of FIG. 1). Thereafter, step 424 is performed where the server (e.g., server 102, 114) accesses the database (e.g., database 104, 118) and retrieves the metadata (or modified metadata) that was previously stored therein during step 422. In step 426, the server (e.g., server 102, 114) generates a communication including the metadata (or modified metadata). The communication can also include video data and/or audio data.

Subsequent to completing step 426, the method 400 continues with step 428. In step 428, the server (e.g., server 102, 114) communicates the previously generated communication to each of the user computer systems (e.g., user computer system 106, . . . , 112, 124). Step 430 generally involves performing user actions at one or more of the user computer systems (e.g., user computer system 106, . . . , 112, 124) to select certain annotations that are not to be displayed thereon. Step 430 can also involve accessing a drop down menu and selecting an item from a list provided by the drop down menu. The list can include, but is not limited to, identifiers of user computer systems or locations where the user computer systems reside. The invention is not limited in this regard.

In step 432, the motion imagery and annotations (that were not selected in the previous step 430) are simultaneously displayed to users of the respective user computer systems (e.g., user computer system 106, . . . , 112, 124). It should be noted that the annotations appear on top of a respective frame or segment of the motion imagery. It should also be noted that the users can remove an annotation from a display at any time while viewing the motion imagery. Thereafter, step 434 is performed where the method 400 returns to step 412 of FIG. 4A.

Figure 5:
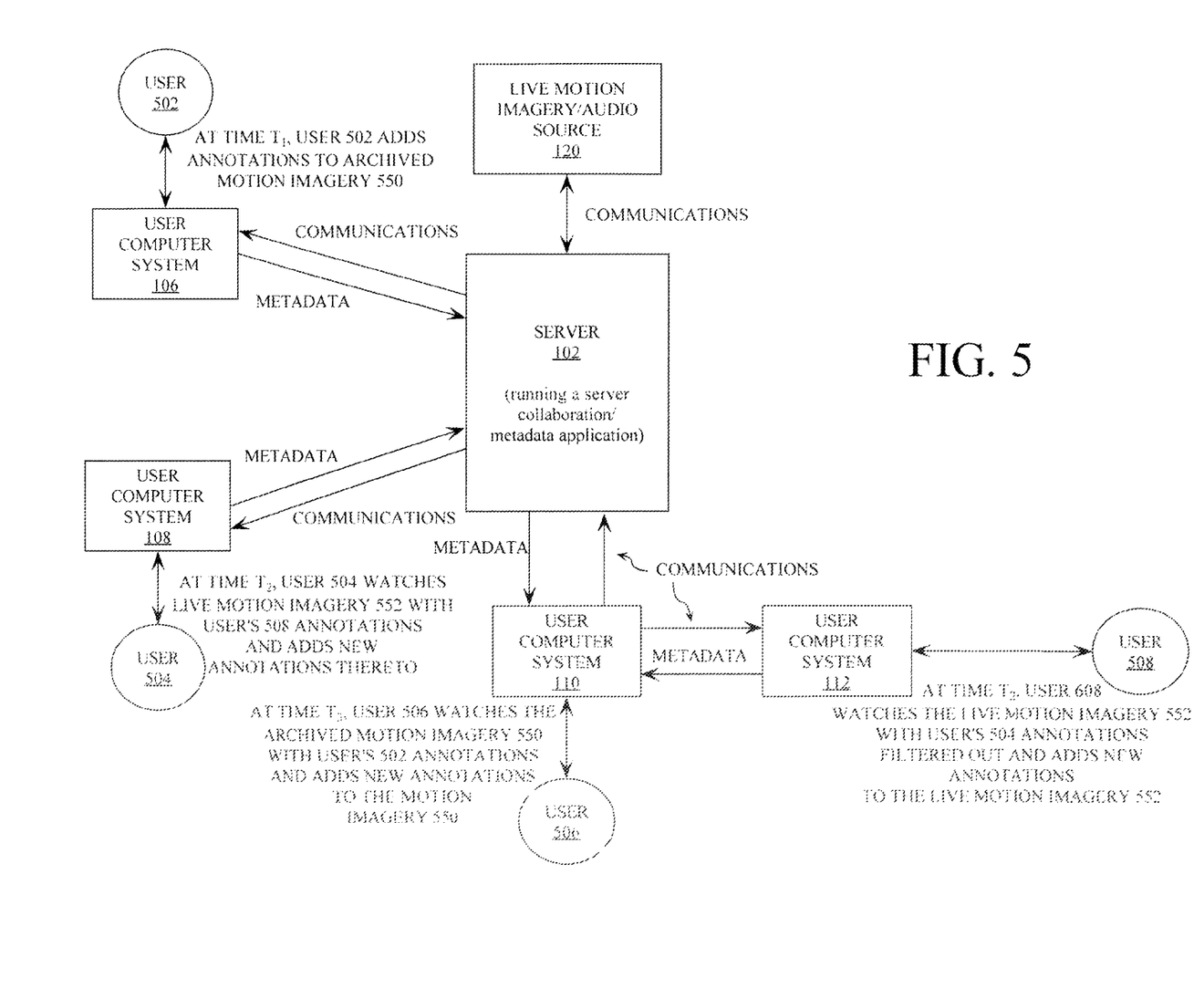
FIG. 5 is a schematic illustration of an exemplary operation of the communications system shown in FIG. 1 implementing the method of FIGS. 4A-4B.

Referring now to FIG. 5, there is provided a schematic illustration of an exemplary operation of the communications system shown in FIG. 1 implementing the method of FIGS. 4A-4B. It should be noted that FIG. 5 illustrates a synchronous and asynchronous collaboration of certain projects by users 502, 504, 506, 508 of user computer systems 106, 108, 110, 112 located at different geographical locations. The synchronous collaboration is performed using live motion imagery 552. The phrase "synchronous collaboration" as used herein refers to two-way communications having virtually no time delays. Still, the invention is not limited in this regard. For example, the synchronous collaboration can alternatively be performed using achieved motion imagery. In contrast, the asynchronous collaboration is achieved using archived motion imagery 550. The phrase "asynchronous collaboration" as used herein refers to two-way communications having time delays. In an asynchronous collaboration scenario, users can analyze the archived motion imagery and related annotations at their own rate.

As shown in FIG. 5, a user 502 of the user computer system 106 (described above in relation to FIGS. 1 and 2) performs user actions to add at least one annotation to archived motion imagery 550 displayed at time $T_1$ on the user computer system 106. It should be noted that the addition of an annotation can be achieved by performing user actions for annotating the motion imagery 550, generating metadata defining the annotation and its context, and communicating the metadata from the user computer system 106 to the server 102 for storage in a storage device (e.g., database 104 described above in relation to FIG. 1). It should also be noted that the annotation can include a free hand annotation, a text annotation, a symbolic annotation, or an audio annotation.

At time $T_2$ (subsequent to time $T_1$), a user 504 of the user computer system 108 (described above in relation to FIG. 1) and a user 508 of the user computer system 112 (described above in relation to FIG. 1) concurrently watch the same live motion imagery 552 and add new annotations to the same. Notably, the user 504 simultaneously watches the motion imagery 552 and annotations being made by user 508 in real time. In contrast, the user 508 has performed user actions to filter out annotations made to the motion imagery 552 by the user 504. As such, any annotations made by user 504 to the motion imagery 552 will not be displayed on the user computer system 112. It should be noted that user 508 can perform user actions at any time while viewing the motion imagery 552 to display (or stop filtering out) the annotations made by user 504. It should also be noted that the users 504, 508 can converse auditory or textually with each other about the motion imagery or annotations via a network in real time.

At time $T_3$ (subsequent to time $T_1$ and $T_2$), a user 506 of the user computer system 110 simultaneously watches the archived motion imagery 550 and the annotations made by user 502 at time $T_1$. The user 506 also performs user actions to add new annotations to the archived motion imagery 550. It should be noted that the addition of an annotation can be achieved by performing user actions for annotating the motion imagery 550, generating metadata defining the annotation and its context, and communicating the metadata from the user computer system 110 to the server 102 for storage in a storage device (e.g., database 104 described above in relation to FIG. 1). It should also be noted that the annotation can include a free hand annotation, a text annotation, a symbolic annotation, or an audio annotation.

In light of the forgoing description of the invention, it should be recognized that the present invention can be realized in hardware, software, or a combination of hardware and software. The methods according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for online collaboration among a plurality of users of a plurality of client devices at different locations sharing common motion imagery, comprising the steps of:
    storing data defining a motion imagery in a data store associated with a motion image server;
    communicating said motion imagery from said motion image server to at least a first client device of said plurality of client devices;
    responsive to an input command from a first one of said plurality of users, generating at said first client device at least one annotation capable of being displayed together with said motion imagery, said at least one annotation defined by metadata distinct from said data defining said motion imagery and containing information to associate said metadata with said motion imagery;
    communicating said metadata from said first client device to said motion image server;
    storing said metadata in said data store;
    communicating said data defining said motion imagery and said metadata to a second client device of said plurality of client devices;
    selectively displaying said at least one annotation together with said motion imagery on said second client device responsive to at least one input command of a second one of said users; and
    automatically adapting, by at least one of said first client device, said second client device and said motion image server, said annotation in accordance with changes of a dynamic feature of said motion imagery or in accordance with changes in content of said motion imagery.

2. The method according to claim 1, wherein said motion imagery is archived motion imagery or live motion imagery.

3. The method according to claim 1, wherein said at least one annotation is a free hand annotation, a text annotation, a symbolic annotation, or an audio annotation.

4. The method according to claim 1, further comprising the step of including in said metadata at least one of information identifying a specific user and a specific client device which generated an annotation.

5. The method according to claim 1, further comprising the step of automatically deforming, by at least one of said first client device, said second client device or said motion image server, said annotation to substantially conform to a shape of said dynamic feature of said motion imagery.

6. The method according to claim 5, wherein at least one of temporal and spatial information in said motion imagery is used to deform said annotation to said shape of said dynamic feature.

7. The method according to claim 1, further comprising the steps of concurrently displaying said motion imagery on said first and second client devices, and displaying together with said motion imagery said at least one annotation to said second user immediately after said annotation has been generated at said first client device.

8. The method according to claim 1, further comprising the steps of concurrently communicating said motion imagery to a plurality of client devices, and generating a plurality of different annotations to said motion imagery in response to input commands from respective users of said plurality of client devices.

9. The method according to claim 1, wherein said step of storing said metadata further comprises storing said metadata separate from said data defining said motion imagery.

10. An online collaboration system, comprising:
    a data store;
    a motion image server coupled to said data store, said motion image server configured for storing data defining motion imagery in said data store and communicating said motion imagery to a plurality of client devices;
    a first client device coupled to said motion image server, said first client device configured for generating at least one annotation capable of being displayed together with said motion imagery in response to a user action, and communicating metadata to said motion image server for storage in said data store; and
    a second client device coupled to said motion image server, said second client device configured for receiving said data defining said motion imagery and said metadata from said motion image server, and selectively displaying said at least one annotation together with said motion imagery in response to at least one input command from a user;
    wherein said at least one annotation is defined by metadata distinct from said data defining said motion imagery and containing information to associate said metadata with said motion imagery; and
    wherein at least one of said first client device, said second client device and said motion image server is further configured for automatically adapting said annotation in accordance with changes in a dynamic feature of said motion imagery or in accordance with changes in content of said motion imagery.

11. The online collaboration system according to claim 10, wherein said motion imagery is archived motion imagery or live motion imagery.

12. The online collaboration system method according to claim 10, wherein said at least one annotation is a free hand annotation, a text annotation, a symbolic annotation, or an audio annotation.

13. The online collaboration system method according to claim 10, wherein said metadata includes at least one of information identifying a specific user and a specific client device which generated an annotation.

14. The online collaboration system method according to claim 10, wherein at least one of said first client device, said second client device, and said motion image server is further configured for automatically deforming said annotation to conform to a shape of said dynamic feature of said motion imagery.

15. The online collaboration system method according to claim 14, wherein at least one of said first client device, said second client device, and said motion image server is further configured for using at least one of temporal and spatial information in said motion imagery to deform or adapt said annotation.

16. The online collaboration system method according to claim 10, wherein said motion imagery is concurrently displayed on said first and second client devices and said at least one annotation is displayed together with said motion imagery on said second client device immediately after said annotation has been generated at said first client device.

17. The online collaboration system method according to claim 10, wherein said motion image server is further configured for concurrently communicating said motion imagery to said plurality of client devices, and said plurality of client devices are configured for generating a plurality of different annotations to said motion imagery in response to input commands from respective users of said plurality of client devices.

18. The online collaboration system method according to claim 10, wherein said motion image server is configured for storing said metadata separate from said data defining said motion imagery.

* * * * *